US009875557B2

(12) United States Patent
Napier et al.

(10) Patent No.: US 9,875,557 B2
(45) Date of Patent: Jan. 23, 2018

(54) EXTRINSIC CALIBRATION OF IMAGING SENSING DEVICES AND 2D LIDARS MOUNTED ON TRANSPORTABLE APPARATUS

(71) Applicant: The Chancellor Masters and Scholars of The University of Oxford, Oxfordshire (GB)

(72) Inventors: Ashley Alan Napier, Oxford (GB); Paul Michael Newman, Oxford (GB)

(73) Assignee: The Chancellor Masters and Scholars of the University of Oxford, Oxfordshire (GB)

( * ) Notice: Subject to any disclaimer, the term of this patent is extended or adjusted under 35 U.S.C. 154(b) by 348 days.

(21) Appl. No.: 14/440,294

(22) PCT Filed: Oct. 30, 2013

(86) PCT No.: PCT/GB2013/052821
§ 371 (c)(1),
(2) Date: May 1, 2015

(87) PCT Pub. No.: WO2014/068302
PCT Pub. Date: May 8, 2014

(65) Prior Publication Data
US 2015/0317781 A1    Nov. 5, 2015

(30) Foreign Application Priority Data
Nov. 5, 2012 (EP) ..................................... 12275168
Nov. 5, 2012 (GB) .................................. 1219850.3

(51) Int. Cl.
*H04N 7/18*      (2006.01)
*G06T 7/80*      (2017.01)
(Continued)

(52) U.S. Cl.
CPC .............. *G06T 7/85* (2017.01); *G01S 7/4808* (2013.01); *G01S 7/497* (2013.01); *G01S 17/023* (2013.01);
(Continued)

(58) Field of Classification Search
CPC .......... G06T 7/002; G06T 7/85; G06T 5/002; G06T 2207/10028; G06T 2207/30241;
(Continued)

(56) References Cited

U.S. PATENT DOCUMENTS

2012/0265399 A1* 10/2012 Watanabe ................. B60R 1/00
701/36
2014/0067187 A1* 3/2014 Ferguson .............. B60W 30/00
701/28

FOREIGN PATENT DOCUMENTS

JP    2011220732 A    11/2011
WO    2012050595 A1    4/2012
WO    2014068302 A1    5/2014

OTHER PUBLICATIONS

International Search Report and Written Opinion received for Patent Application No. PCT/GB2013/052821, dated Dec. 6, 2013. 11 pages.
(Continued)

*Primary Examiner* — Allen Wong
(74) *Attorney, Agent, or Firm* — Finch & Maloney PLLC (57) ABSTRACT

A method and system for determining extrinsic calibration parameters for at least one pair of sensing devices mounted on transportable apparatus obtains (202) image data (110) representing images captured by an image generating sensing device (102) of the pair at a series of poses during motion through an environment (120) by transportable apparatus (100). The method obtains (202) data (112) representing a 3D point cloud based on data produced by a 2D LIDAR sensing device (104) of the pair. The method selects (204) an
(Continued)

image captured by the image at a particular pose. The method generates (210) a laser reflectance image based on a portion of the point cloud corresponding to the pose. The method computes (212) a metric measuring alignment between the selected image and the corresponding laser reflectance image and uses (214) the metric to determine extrinsic calibration parameters for at least one of the sensing devices.

20 Claims, 7 Drawing Sheets

(51) Int. Cl.
*G06T 5/00* (2006.01)
*H04N 13/02* (2006.01)
*G01S 17/02* (2006.01)
*G01S 17/89* (2006.01)
*G01S 7/48* (2006.01)
*G01S 7/497* (2006.01)

(52) U.S. Cl.
CPC ............. *G01S 17/89* (2013.01); *G06T 5/002* (2013.01); *H04N 13/0221* (2013.01); *H04N 13/0246* (2013.01); *G06T 2207/10028* (2013.01); *G06T 2207/30241* (2013.01); *G06T 2207/30252* (2013.01)

(58) Field of Classification Search
CPC ...... G06T 2207/30252; H04N 13/0246; H04N 13/0221; G01S 7/497; G01S 7/4808; G01S 17/89; G01S 17/023
USPC ......................................................... 348/148
See application file for complete search history.

(56) References Cited

OTHER PUBLICATIONS

GB Intellectual Property Office Search Report under Section 17(5) received for GB Patent Application No. 1219850.3 dated Mar. 18, 2013. 4 pages.
EP Intellectual Property Office Extended Search Report received for EP Patent Application No. 12275168.8, dated May 3, 2013. 7 pages.
Li, et al., "Extrinsic Calibration between a Stereoscopic System and a LIDAR with Sensor Noise Models," IEEE International Conference on Multisensor Fusion and Integration for Intelligent Systems. Sep. 13-15, 2012. pp. 484-489.
Kwak, et al., "Extrinsic Calibration of a Single Line Scanning Lidar and a Camera," IEEE/RSJ International Conference on Intelligent Robots and Systems, Sep. 25-30, 2011. pp. 3283-3289.
Duraisamy, et al., "Estimation of Camera Matrix using Lidar and Aerial Images," Applications of Digital Image Processing XXXIV. Aug. 22-24, 2011. 5 pages.
Rodriguez, et al., "Extrinsic Calibration between a Multi-Layer Lidar and a Camera," Proceedings of IEEE International Conference on Multisensor Fusion and Integration for Intelligent Systems. Aug. 20-22, 2008. pp. 214-219.
Ding, et al., Automatic registration of aerial imagery with untextured 3D LIDAR models, IEEE Conference on Computer Vision and Pattern Recognition. 2008. 8 pages.
Scaramuzza, et al., "Extrinsic Self Calibration of a Camera and a 3D Laser Range Finder from Natural Scenes," Proceddings of the IEEE/RSJ International Conference on Intelligent Robots and Systems. Oct. 29-Nov. 2, 2007. pp. 4164-4169.

* cited by examiner

EXTRINSIC CALIBRATION OF IMAGING SENSING DEVICES AND 2D LIDARS MOUNTED ON TRANSPORTABLE APPARATUS

The present invention relates to extrinsic calibration of imaging sensing devices and 2D LIDARs mounted on transportable apparatus.

Two of the most prevalent sensors in robotics, especially in the transport domain, are cameras and LIDAR. Increasingly, these sensors are being used to supplement each other. Probably one of the most famous examples is Google Street View™, where LIDARs are used with an omnidirectional camera to display planes in the images. In order to achieve this projection of LIDAR scans into images taken by cameras, the extrinsic calibration between the various sensors must be known to a high degree of accuracy.

There are several different known techniques for extrinsic calibration of sensors. The simplest approach is to physically measure the position of sensors relative to each other. This approach, however, proves to be more complicated than first thought as sensors are generally in casings which don't allow for accurate measurement of the sensing element itself.

Another known approach is to place calibration targets into the workspace, which are simultaneously in the field of view of both sensors, and to calibrate with respect to various features observed in both sensor modalities. Known methods of extrinsic calibration of a camera with a 2D range finder or a LIDAR use a checkerboard pattern with varying amounts of user intervention.

Robust long-term autonomy, however, requires a continuous assessment of calibration accuracy, which makes the use of calibration targets impractical. The sensors involved are often included in safety critical systems and need to be able to test the validity of calibrations or recalibrate after bumps, knocks and vibrations. A paper by D. Scaramuzza, A. Harati, and R. Siegwart: Extrinsic self-calibration of a camera and a 3D laser range finder from natural scenes; Intelligent Robots and Systems, IROS; IEEE/RSJ International Conference on Oct. 29-Nov. 2, 2007, presented a method of target-less extrinsic calibration which required the user to specify several point correspondences between 3D range data and a camera image. The method described in Jesse Levinson and Sebastian Thrun: Automatic calibration of cameras and lasers in arbitrary scenes; International Symposium on Experimental Robotics, 2012, reduced the need for user intervention by examining edges in the image which are assumed to correspond to range discontinuities in a scan from a 3D LIDAR. In Gaurav Pandey, James R. McBride, Silvio Savarese and Ryan M. Eustice: Automatic targetless extrinsic calibration of a 3D LIDAR and camera by maximizing mutual information; in Proceedings of the AAAI National Conference on Artificial Intelligence, 2012, the reflectance values from a static 3D LIDAR are used to register the laser data against captured images using a cost function based on Mutual Information.

Embodiments of the present invention are intended to address at least some of the problems discussed above. Embodiments of the approach described herein exploit the fact that scenes in 3D laser light look similar to scenes as recorded by an off-the-shelf camera. Some embodiments move a 2D push-broom LIDAR through its environment in order to create a 3D point cloud. A 3D point cloud can then be constructed using a trajectory estimate—obtained using an Inertial Navigation System (INS) or visual odometry (VO), for instance—and data obtained from a 2D LIDAR. The 3D point cloud can then be projected into the camera and a laser reflectance image may be generated. Embodiments can use an edge-based, weighted Sum of Squared Difference (SSD) objective function to measure the alignment of an image taken from the camera and the laser reflectance image. A grid-based optimisation can be used to search over the SE3 pose that defines the extrinsic calibration and maximise the alignment of the camera image and the generated laser reflectance image. The best estimate of the extrinsic calibration can be based on the best alignment of the two images.

Embodiments can estimate the full SE3 transformation between the LIDAR and the camera without the need for artificial calibration targets or other human intervention; they simply require the two sensors to undergo general motion in arbitrary scenes. For every iteration in the solution, a trajectory estimate can be used to synthesise a 3D swathe of laser data. From this, a view from the current camera position relative to the LIDAR can be synthesised. When the calibration is correct the synthesised laser view and the camera image can have maximal alignment. This approach can leverage the gross appearance of the workspace and requires no feature extraction.

Embodiments may use a 3D swathe built from LIDAR data to retrospectively compare data from cameras and the LIDAR. Embodiments can synthesise laser reflectance images based on the putative calibration between sensors and measure how well they align using a robust metric in the form of a gradient based Sum of Squares objective function.

According to a first aspect of the present invention there is provided a method of determining extrinsic calibration parameters for at least one pair of sensing devices mounted on transportable apparatus, the method including or comprising:

obtaining image data representing a plurality of images captured by an image generating sensing device of the pair at a series of poses during motion through an environment of transportable apparatus;

obtaining data representing a 3D point cloud based on data produced by a 2D LIDAR sensing device of the pair during the motion through the environment of the transportable apparatus;

selecting a said image from the image data, the image being captured by the image generating sensing device at a particular said pose;

generating a laser reflectance image based on a portion of the 3D point cloud data corresponding to the particular pose of the image generating sensing device;

computing a metric indicating a measure of alignment between the selected image and the corresponding laser reflectance image, and using the metric to determine extrinsic calibration parameters for at least one of the sensing devices.

The method may use cubic interpolation to sample intensity values of pixels of the laser reflectance image and pixels of the selected image to generate the laser reflectance image as a function of extrinsic calibration parameters of the laser range finding sensing device.

The computing of the metric may use an edge-based, weighted Sum of Squared Difference (SSD) objective function to measure the alignment of the selected image and the laser reflectance image. The method may include performing a Gaussian smoothing operation on the selected image and the laser reflectance image. The method may include performing patch-based normalisation of the selected image and the laser reflectance image.

The method may use an iterative grid-based optimisation technique to search over the poses that maximise the alignment of the selected image and the laser reflectance image. Thus, the best estimate of the extrinsic calibration can be based on the best alignment of the two images.

The 3D point cloud can be constructed using a trajectory estimate obtained using an INS or visual odometry.

According to a further aspect of the present invention there is provided a method of calibrating sensing devices mounted on transportable apparatus substantially as described herein.

According to yet another aspect there is provided a method of generating image data having laser reflectance values substantially as described herein.

According to another aspect of the present invention there is provided apparatus determining extrinsic calibration parameters for at least one pair of sensing devices mounted on transportable apparatus, the apparatus including or comprising:
 a device configured to obtain image data representing a plurality of images captured by an image generating sensing device of the pair at a series of poses during motion through an environment by transportable apparatus;
 a device configured to obtain data representing a 3D point cloud based on data produced by a 2D LIDAR sensing device of the pair during the motion through the environment by the transportable apparatus;
 a device configured to select a said image from the image data, the image being captured by the image generating sensing device at a particular said pose;
 a device configured to generate a laser reflectance image based on a portion of the 3D point cloud data corresponding to the particular pose of the image generating sensing device;
 a device configured to compute a metric indicating a measure of alignment between the selected image and the corresponding laser reflectance image, and
 a device configured to use the metric to determine extrinsic calibration parameters for at least one of the sensing devices.

According to yet another aspect of the present invention there is provided apparatus for determining extrinsic calibration parameters for at least one pair of sensing devices mounted on transportable apparatus, the apparatus including or comprising:
 an image generating sensing device of the pair for, in use, producing image data representing a plurality of images captured at a series of poses during motion through an environment by transportable apparatus;
 a 2D LIDAR sensing device of the pair for, in use, producing laser data during the motion through the environment by the transportable apparatus;
 a device configured to generate 3D point cloud data based on the laser data;
 a device configured to select a said image from the image data, the image being captured by the image generating sensing device at a particular said pose;
 a device configured to generate a laser reflectance image based on a portion of the 3D point cloud data corresponding to the particular pose of the image generating sensing device;
 a device configured to compute a metric indicating a measure of alignment between the selected image and the corresponding laser reflectance image, and
 a device configured to use the metric to determine extrinsic calibration parameters for at least one of the sensing devices.

The image generating sensing device may comprise a stereo or monocular camera.

According to yet another aspect of the present invention there is provided a vehicle (or vehicle-mounted apparatus) including apparatus substantially as described herein.

According to other aspects of the present invention there are provided computer program elements comprising: computer code means to make the computer execute methods substantially as described herein. The element may comprise a computer program product.

According to other aspects of the present invention there is provided apparatus including a processor configured to execute methods substantially as described herein.

Whilst the invention has been described above, it extends to any inventive combination of features set out above or in the following description. Although illustrative embodiments of the invention are described in detail herein with reference to the accompanying drawings, it is to be understood that the invention is not limited to these precise embodiments.

Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

The invention may be performed in various ways, and, by way of example only, embodiments thereof will now be described with reference to the accompanying drawings in which.

Figure 1:
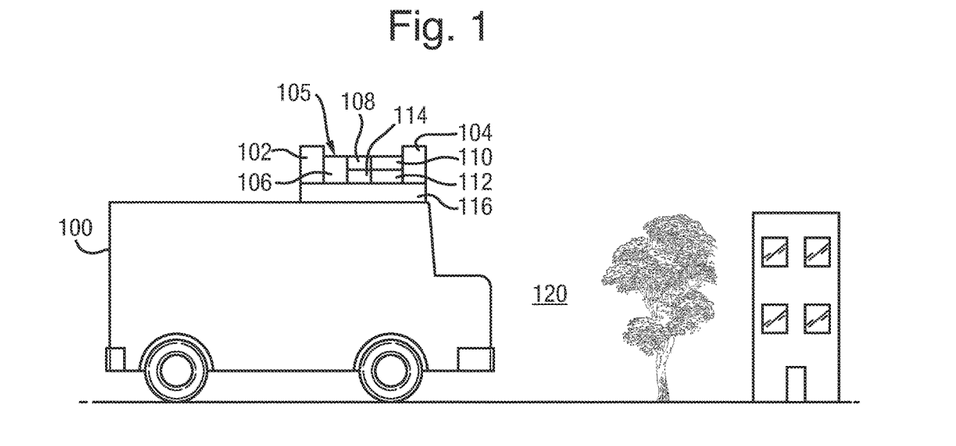
FIG. 1 is a schematic drawing of a vehicle having sensing devices, in the form of a camera and a LIDAR, and a computing device configured to perform a calibration method in accordance with an embodiment of the invention.

FIG. 1 shows schematically transportable apparatus in the form of a vehicle 100 that is fitted with a first sensing device 102 capable of generating image or video data and a second laser range finding 2D LIDAR sensing device 104. It will be appreciated that the sensing devices 102 and 104 need not be mounted in close proximity, but simply mounted rigidly to the transportable apparatus. The vehicle 100 also has a computing device 105 having a processor 106 and memory 108. The computing device is in communication with the sensors 102, 104 (via a wireless or wired communications interface) and is capable of storing and processing data 110, 112 relating to data signals received from the sensors using an application 114. The computing device 104 can further include other conventional features, such as a user interface and a communications interface that allows it to exchange data with remote devices.

In some embodiments, at least some of the above components may be provided on a sensor platform 116 that can be removably mounted on the vehicle 100, although in other cases the various components can be mounted on/in the vehicle in a different manner. In some embodiments the sensor platform includes on board computing and multiple sensors, such as a SICK 2D LIDAR 104 and a PointGrey BumbleBee stereo camera 102. However, it will be understood that the image data sensing device can be any device capable of generating time-stamped image/video data. The image data may be colour (which are converted to monochrome/greyscale), monochrome or greyscale and the images may be generated in day/ambient light or additional light-sources or flashes can be used. The laser range finding device could also be any type of LIDAR capable of measuring range as well as surface reflectance. Although the embodiment detailed herein involves one camera and one LIDAR, it will be understood that the method can be adapted to work with other numbers/combinations of sensing devices. For instance, in some embodiments, the method could be modified for the calibration of multiple cameras to LIDARs in a joint optimisation (see Quoc V. Le and Andrew Y. Ng. Joint calibration of multiple sensors. Intelligent Robots and Systems, 2009), or used to calibrate push broom LIDAR to push broom LIDAR via generation of multiple LIDAR reflectance images.

The sensor platform 116 can be designed to be easily mounted onto any vehicle, e.g. by fitting onto a roof rack, and enable fast and reliable collection of survey data. In other embodiments either or both of the sensing devices can be mounted rigidly on the movable apparatus without the sensor platform. The 2D LIDAR 104 and camera 102 may not necessarily have overlapping fields of view when stationary, meaning a retrospective calibration technique is required for data-based extrinsic calibration. In alternative embodiments, data from at least one of the sensing devices 102, 104 may be transferred (either by substantially real time data transmission or using a removable storage device) to a remote computing device for processing rather than being processed by an on board computing device. The output of that remote processing may be transferred to the sensor(s) for use in calibration.

In use, the vehicle 100 travels through the surrounding environment 120 and the image generating sensing device 102 captures image data relating to the scene/environment around the vehicle. Although the example vehicle is a land-based vehicle travelling along a road/ground surface, it will be appreciated that in alternative embodiments, the vehicle could be any type of vehicle that may be travelling through any kind of conventional indoor/outdoor environment. Further, in other embodiments, the sensor and the computing device need not be fitted to/on a vehicle, but can be included in a hand-held navigation device, for example. The laser range finding sensing device 104 also captures data relating to the scene/environment as the vehicle moves.

Figure 2:
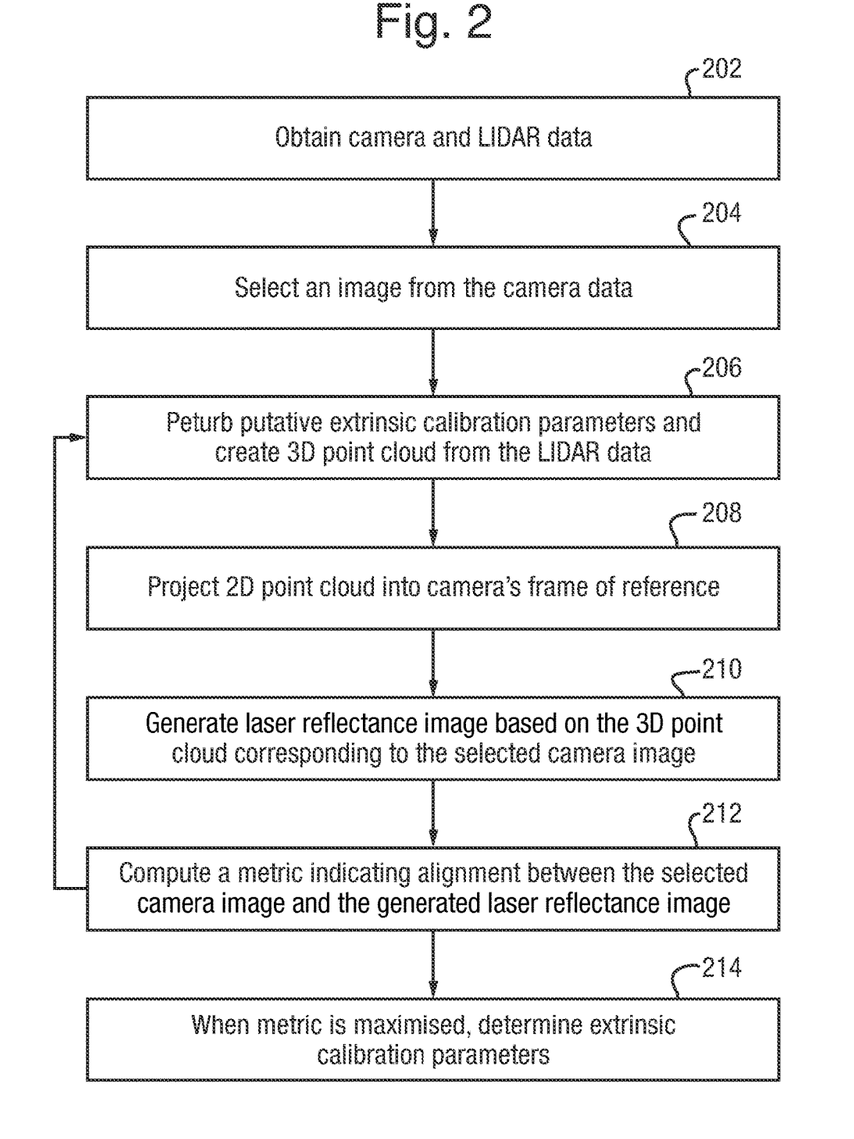
FIG. 2 is a flow chart illustrating steps involved in the example method.

The application 114 executing on the computing device 105 is configured to process the data 110, 112 received from the sensors 102, 104 in order to produce calibration parameters for at least one of the sensing devices. FIG. 2 illustrates schematically example steps of the method performed by the application 114. The skilled person will appreciate that the steps are exemplary only and that in alternative embodiments, some of them may be omitted and/or re-ordered. Further, the method can be implemented using any suitable programming language and data structures.

At step 202, the application 114 obtains data 110 based on signals received from the image generating sensing device 102, which may be in any suitable data format, e.g. PNM or BMP. The application also obtains data 112 based on signals received from the laser range finding sensing device 104, which, again, can be in any suitable format; one embodiment uses a simple text file with a list of timestamps, ranges and reflectances. In some embodiments, the data may be obtained from at least one storage device (e.g. pre-recorded survey data), which may, or may not, be on board the computing device 105, but in other cases, at least some of the data may be received in real time over a communications link, e.g. a live feed from at least one of the sensing devices.

At step 204, the application 114 selects an image from the plurality of camera images that will form the basis of a comparison with a laser reflectance image created from the LIDAR data (as will be described below). Initially, this selection can be done in any suitable way, e.g. simply the first image in the series/sequence obtained. At step 206, the application creates a 3D point cloud based on the LIDAR data 112 (although in alternative embodiments, the method may simply obtain pre-prepared data of this type at step 202) and generates putative extrinsic calibration parameters. A detailed description of the techniques and mathematical basis for the steps performed during the method executed by application 114 will be given below with reference to FIG. 3 onwards. The skilled person will appreciate that it is possible to implement embodiments of the method based on the equations and calculations given below or any mathematical equivalents.

The problem of extrinsic calibration can be posed in the context of view matching. In order to synthesise a view of the world in laser light to compare to a camera image the method first constructs a swathe of 3D points and corresponding reflectance values. To generate meaningful 3D point clouds a trajectory estimate for the push broom LIDAR is required. In the general case shown in FIG. 3, which shows the base trajectory $X^b(t)$ and the camera $X^c(t_k)$ and laser $X^l(t_i)$ trajectories relative to it. It should be noted that this is the general case, but in the results presented below visual odometry is used so that the camera trajectory and base trajectory are one and the same, reducing the dimensionality of the search space from twelve degrees of freedom to six. A base trajectory $X^b(t)$ is a full SE3 pose as a function of time. $X^b(t)$ can be derived from a multitude of sensors, including an inertial navigation system (INS) or visual odometry (VO), as long as the trajectory is metrically accurate over the scale of the swathe. The poses of the LIDAR and cameras are given relative to this base trajectory. In order to ensure millisecond timing accuracy, embodiments can use the TicSync library (Alastair Harrison and Paul Newman. Ticsync: Knowing when things happened; Procs. IEEE International Conference on Robotics and Automation, 2011) to synchronise the clocks of the sensors to the main computers.

Figure 3:
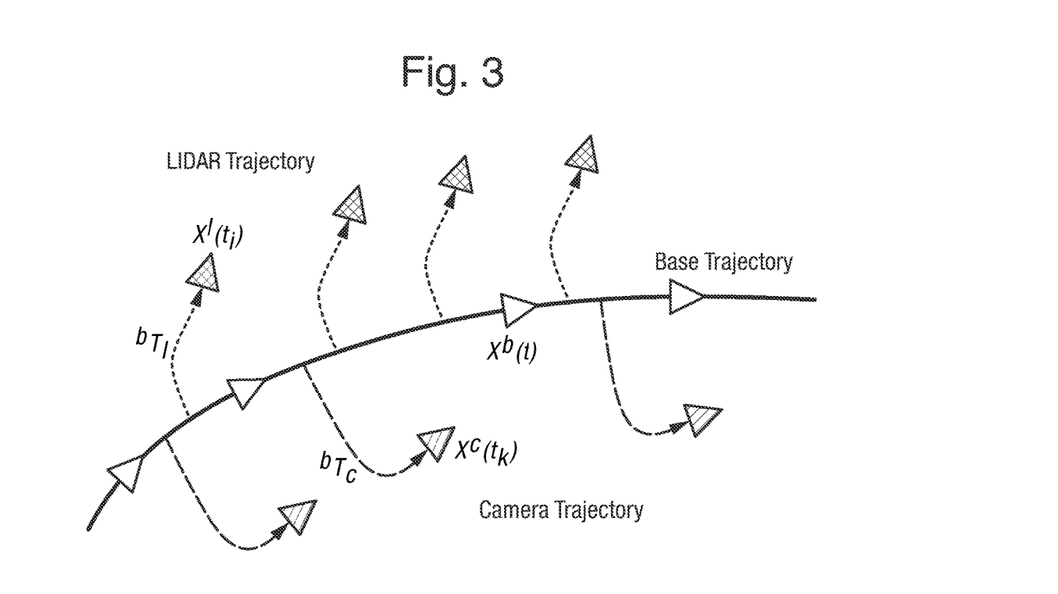
FIG. 3 is an illustration of a base trajectory, a camera sensing device trajectory and a LIDAR sensing device trajectory.

Let the $i^{th}$ LIDAR scan be recorded at time $t_i$ and consist of a set of points, $x_i$, and a set of corresponding reflectance values, $R_i$, such that laser point j in this scan, $x_{i,j}=[x_j, y_j]^T$, is associated with reflectance value $R_{i,j}$. (It should be noted that this assumes a relatively low speed and use of the same time for each scan, in some cases each scan can take 20 ms, it would be a minor step to compute the time and pose of the LIDAR for every individual measurement). The method can compute the pose of the laser $X^l(t_i)$ based on the current putative extrinsic calibration $^bT_l$ and the base trajectory.

$$X^l(t_i) = X^b(t_i) \oplus {}^b T_l \quad (1)$$

Each scan can then be projected into a local 3D scene $P_i$ creating a swathe of laser data.

$$P_i = X^l(t_i) \oplus x_i \quad (2)$$

The method can generate a swathe as a function of the extrinsic calibration between the sensor base trajectory and the LIDAR.

The next stage involves generating laser reflectance images as viewed from the pose of the camera capturing an image $l_c^k$. As discussed below, due to the different positioning of the two sensing devices on board the vehicle 100, it is useful to compare the views of the environment taken by the two devices from the same position, which can involve transforming the LIDAR-based data to the frame of reference of the image generating sensing device in the detailed embodiment. However, in other embodiments, other techniques may be used to achieve this, e.g. transforming the camera-based data to the reference frame of the LIDAR. In the detailed embodiment, the swathe $P_i$ is transformed into the camera's frame of reference using the current estimate of the extrinsic calibration between the base trajectory and the camera $^bT_c$. Thus, at step 208, the application 114 projects the 3D point cloud into the frame of reference of the image generating sensing device 102. The pose of the camera $X^c(t_k)$ at time $t_k$ can be written as $$X^c(t_k) = X^b(t_k) \oplus {}^b T_c \quad (3)$$

The swathe is then transformed into the camera's frame and projected into the camera using the camera's intrinsics, K, which are assumed to be known. Thus, $$p_{i,k} = \text{proj}(\ominus X(t_k) \oplus P_i, K) \quad (4)$$

This gives the pixel locations of the swathe points in the camera image $l^ck$.

At step 210 the application 114 generates a laser reflectance image based on the projected 3D point cloud data. At this point it would be possible to use the individual laser data and compare their reflectivity to the pixel intensities in $l_k^c$. However, the density of the points is extremely variable due to foreshortening effects. The inventors therefore used cubic interpolation to sample the intensities $R_i$ at pixel locations $p_{i,k}$ over the same grid as the pixels in $l_k^c$. In alternative embodiments a different interpolation method, such as nearest neighbour, linear, or any order polynomial technique could be used. The cubic interpolation generates a laser reflectance image $l_k^l({}^bT_c, {}^bT_l)$ as a function of the extrinsic calibration, an example of which can be seen in FIG. 4. From left to right in the Figure: interpolated laser reflectance image at estimated extrinsic calibration $l_k^l({}^cT_l)$; actual camera image $l_k^c$; interpolated laser image with incorrect calibration $l_k^l({}^cT_{0l})$. The example data set was collected during a parking manoeuvre.

In this embodiment the base trajectory $X^b(t)$ can be derived from stereo visual odometry (see G Sibley, C Mei, I Reid, and P Newman: Vast-scale Outdoor Navigation Using Adaptive Relative Bundle Adjustment; The International Journal of Robotics Research, 2010). This simplifies the extrinsic calibration as the base frame is the same as the camera frame reducing $^bT_c$ to the identity and, in turn, the search space from twelve degrees of freedom to six. The laser reflectance image then becomes a function only of $^bT_l$, which is equivalent to $^cT_l$, the extrinsic calibration between the LIDAR and camera.

The system therefore has the capability to take a camera image $l_k^c$ and generate, given data from a 2D LIDAR and knowledge of the platform trajectory, a corresponding laser reflectance image $l_k^l({}^cT_l)$ based on a putative extrinsic calibration between the two sensors. At step 212, the application 114 computes a metric which accurately reflects the quality of the alignment between the two images. Embodiments aim to maximise this metric, which can involve control looping back to step 204 until the metric is found to be maximised, at which point control passes to step 214. The task is made difficult by non-linearities in the reflectance data, rendering basic correlation measures such as mutual information and standard SSD very noisy. The inventors found empirically that taking a smoothed gradient image was far more stable. Further, patch-based normalisation is applied whereby local variations in gradient are normalised to be consistent across the whole image or at least between corresponding patches in $l_k^c$ and $l_k^l({}^cT_l)$.

Figure 4A:
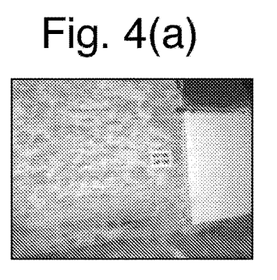
FIG. 4 shows an example interpolated laser reflectance image, an actual camera image and an interpolated laser image with incorrect extrinsic calibration.
Figure 4B:
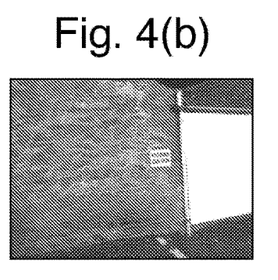
Figure 4C:
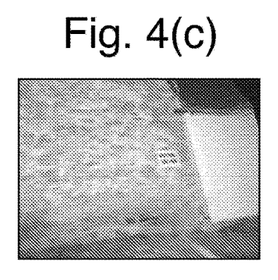
Figure 5:
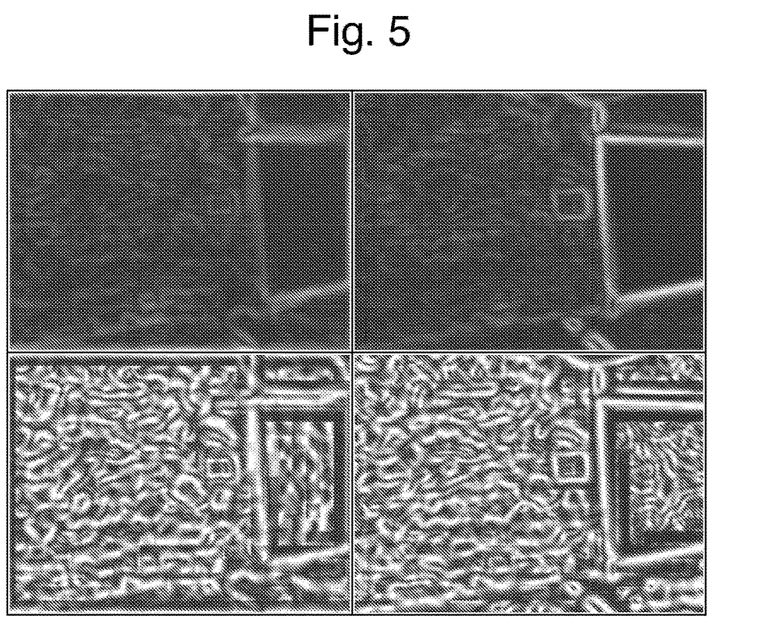
FIG. 5 shows a smoothed edge image from the LIDAR sensing device, the corresponding camera image from FIG. 4, as well as the same images after a patch based normalisation procedure.

In FIG. 5, the smoothed edge image from the laser (top left) and the corresponding camera image from FIG. 4 (top right) are shown. The lower images in FIG. 5 are the same images after the patch based normalisation procedure. It will be noted that details are emphasised by the patch-based normalisation rather than normalisation over a whole image.

The pixel values from both images are then weighted by the inverse of their distance from an actual reflectance measurement $p_{i,k}$, giving extra weight to areas with a higher sampling density. The objective function can thus be expressed as $$O({}^bT_l) = \sum_{I_k^c} w_{I_k^c} \| G(I_k^c) - G(I_k^l({}^cT_l)) \|_2$$

where $G(\bullet)$ denotes a function which performs Gaussian smoothing before taking the magnitude gradient image and performing patch based normalisation. In terms of smoothing, other filter kernels could be used and can produce good results as long as they filter out the high frequency noise in the LIDAR reflectance images.

As shown by the experimental results discussed below, the objective function provides a pronounced narrow convergence basin around the correct solution. The inventors used an iterative grid based optimisation to find a solution. As this calibration is not necessarily required to be a real time application (it can be run as a background process on a vehicle, for example), high speed may not be a priority. Therefore, starting from an initial estimate $^bT_{0l}$, the search for a minimum is conducted along each degree of freedom individually, updating $^bT_l$ as it proceeds. For the results presented below, the method used a range of 30 cm and 10 degrees over 4 scales resulting in a final resolution of ~1 mm and 0.02 degrees. While this brute force optimisation method was found to work well in the experiments, the approach is agnostic to the exact optimisation method used. The estimate for a calibration for a particular image at time k can be explicitly written as $$^c\bar{T}_l = \operatorname*{argmin}_{^cT_l} \sum_{I_k^c} w_{I_k^c} \| Q(I_k^c) - Q(I_k^l({}^cT_l)) \|_2 \quad (6)$$

The application 114 can now obtain, at any time, an estimate for the calibration between the LIDAR and camera.

The experimental results of FIG. 9, discussed below, gave the inventors the intuition that minima at the bottom of a sharp trench are more informative than those at the bottom of a rough, broad bowl. In FIG. 9, the objective function is plotted about the estimated calibration for two example scenes: a) shows an example of how the objective function is convex around the solution and has clear global minima. Away from the minima the objective function can be non-convex, justifying the use of the grid search approach improving the basin of convergence and reducing the required accuracy of the initialization. However, b) shows how certain scenes can produce noisy and ill conditioned objective functions around the solution. The bar charts of inverse variance of the estimate derived from the shape of the objective function at the minima demonstrate how less pronounced minima yield less information and are given less weight in the Bayes filter.

By flipping the cost function and fitting a Gaussian $G(^cT_I, \sigma^2)$ to the peaks (which were minima) it is possible to obtain a likelihood function $L(^cT_I)$. This is the Laplace approximation and results in a "measurement" model parameterised by $\sigma^2$ The inventors used this to fuse a sequence of noisy measurements of the latent state $^cT_I$. Such a sequence $$^cT_I = (^c\tilde{T}_{I1}, ^c\tilde{T}_{I2}, ^c\tilde{T}_{I3} \ldots, ^c\tilde{T}_{IN},)$$

with associated variances $$\Sigma = (\sigma_1^2, \sigma_2^2, \sigma_3^2, \ldots, \sigma_N^2,)$$

is fused via a recursive Bayes filter, allowing them to sequentially update the calibration as new parts of the workspace are entered, without the need for an expensive joint optimisation over N frames. This process of treating each optimisation as a noisy measurement can significantly reduce the standard deviation of the calibration result when compared to the deviation of the raw estimates from individual frames.

At step 214, the maximised metric is used to determine the extrinsic calibration parameters, normally the viewing position and angle, of at least one of the sensing devices 102, 104. In the detailed embodiment, the method determines calibration parameters for the LIDAR 104 with respect to the camera 102, but it will be appreciated that in other embodiments, the method could be modified to calibrate the camera in addition to, or instead of, the LIDAR device (or any other combination of sensing devices mounted on the vehicle).

The determined calibration parameters can be used to actually calibrate the one or more sensing devices, or the calibration information may be shared with any other component/application that can benefit from it. The parameters may be used directly by the at least one sensing device to automatically calibrate it, either continuously or at intervals (e.g. at the start of a new survey, when a movement sensor indicates that the vehicle has been subject to a significant bump/vibration, or at pre-set periodic intervals).

Experiments were carried out to evaluate the performance of the algorithm/application. In the experiments, the known Wildcat vehicle was used as the transportable platform with a Point Grey bumblebee2 stereo camera and SICK LMS-100 2D LIDAR to evaluate the performance. The results shown herein were obtained using several scenes from around a field centre. Swathes of approximately 300 LIDAR scans, equaling over 140,000 measurements, were used for each individual calibration estimate. 73 different images from the left camera of the stereo pair were used to validate the calibration estimate.

In order to estimate the performance and repeatability of the method the inventors first evaluated the calibration for 73 individual frames. The results for this experiment can be seen in FIG. 6 and the table below.

| Standard Deviation | Translation (mm) | | | Rotation (degrees) | | |
| --- | --- | --- | --- | --- | --- | --- |
| | x | y | z | roll | pitch | yaw |
| Individual Results | 28 | 21 | 15 | 1.4 | 1.4 | 1.5 |
| Fused Results | 4.5 | 5.2 | 4.6 | 0.38 | 0.39 | 0.44 |

Figure 8:
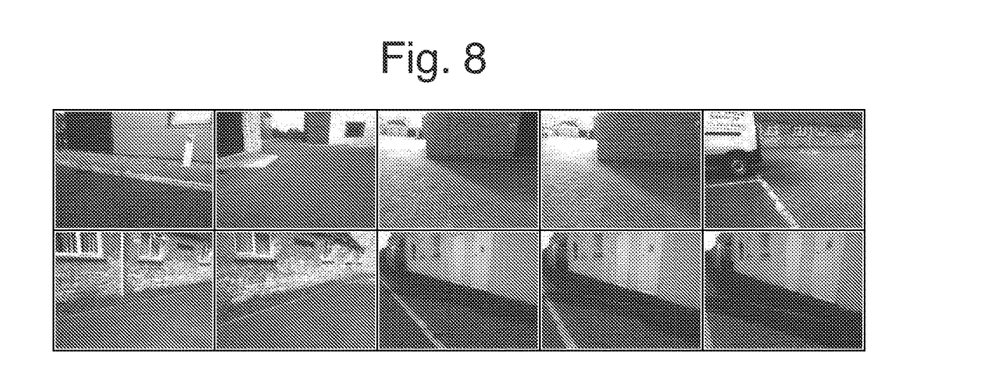
FIG. 8 shows frames used in a fused calibration estimate experiment.

The table shows the standard deviation of the cross-calibration estimate over 73 frames from several scenes, ten of which are shown in FIG. 8. The 10 randomly selected frames of FIG. 8 were used in a fused calibration estimate and it can be seen that the frames are acquired from various positions within different scenes.

The effect of fusing estimates using the Bayes filter can be seen with almost an order of magnitude reduction in the standard deviation of the calibration estimates. The standard deviation of the estimates—which is important as it may not be possible to accurately measure ground truth—for individual frames is of the order of a couple of centimeters and degrees, which is akin to the expected level of accuracy a hand measured calibration would yield. In order to test any improvement achieved by fusion of individual frames the inventors performed twenty N choose M trials with N being the 73 frames and M=10.

Figure 6:
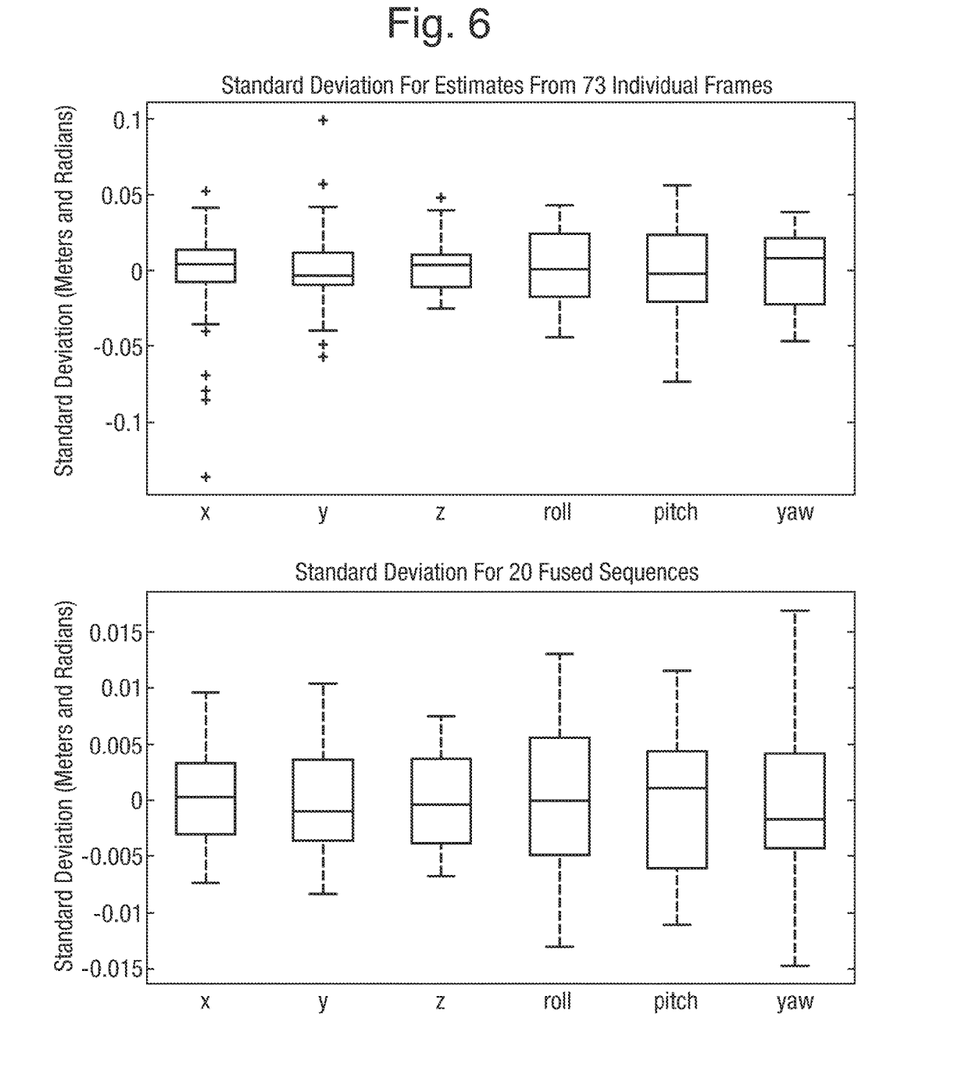
FIG. 6 are box plots relating to experimental results.

For each fused estimate ten random frames were chosen and then fused in sequence using the Bayes filter. An example set of 10 frames can be seen in FIG. 8. The effect of the fusion stage can be seen in FIG. 6 and the table above with the standard deviations decreasing by almost an order of magnitude. FIG. 6 shows box plots of the standard deviation of the extrinsic calibration estimate in each of the six degrees of freedom. The top plot shows the standard deviation of optimisation results from single frames while the bottom shows the deviation after fusing multiple frames using Laplace's approximation and a recursive Bayes filter. Twenty fused results were generated by selecting sequences of ten random calibration estimates from the possible 73 single frames in a M pick N trial. It can be seen that after fusion the standard deviation is significantly reduced, see the table above for details, and outliers are effectively ignored. Boxes extend from the 25th to 75th percentiles, whiskers extent to the extremes of the data not considered to be outliers, which are denoted by red crosses. Note the different vertical scales.

Figure 7:
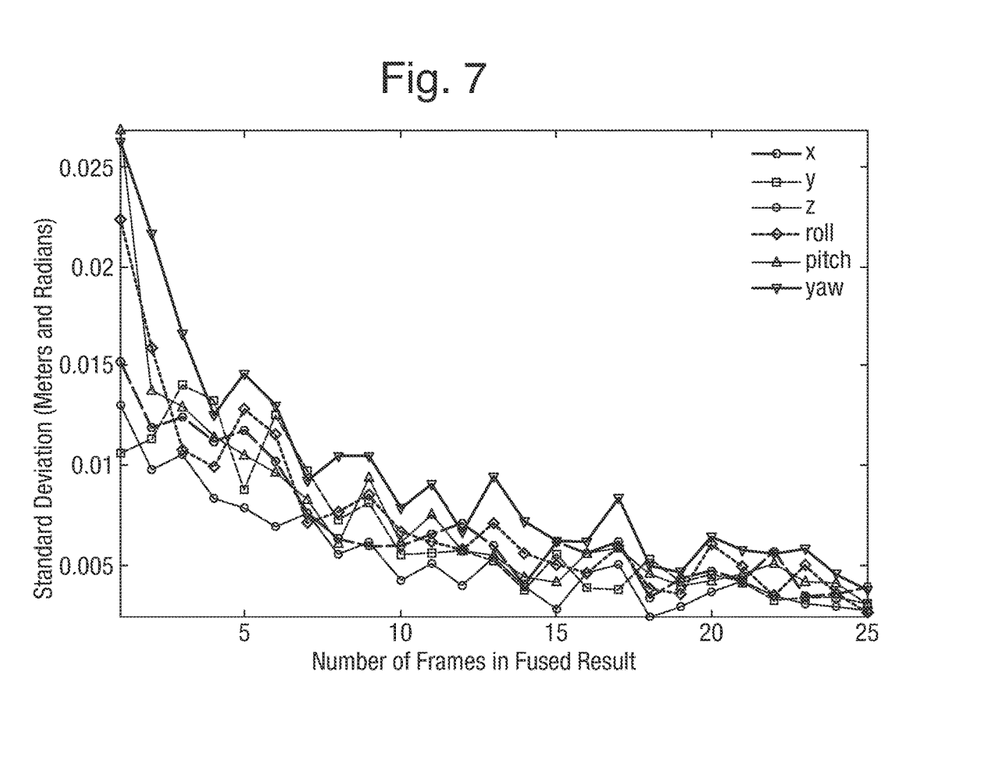
FIG. 7 is a graph relating to experimental results.

FIG. 7 shows how the standard deviation of calibration estimates decrease as more individual estimates are fused together; the effect appears to saturate after approximately ten frames. This data represents twenty sequences of 25 frames randomly selected from a possible 73 frames.

Figure 9A:
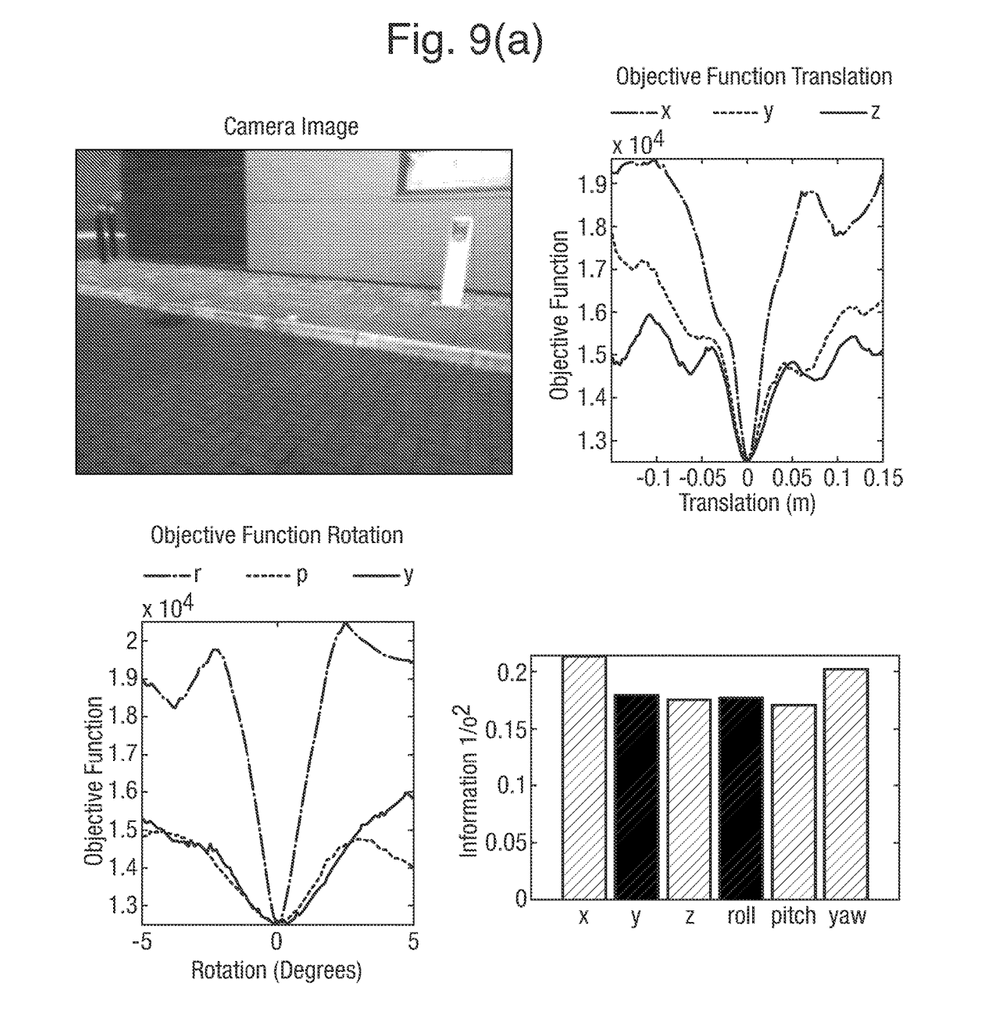
FIG. 9 are further frames and graphs relating to the experimental results.
Figure 9B:
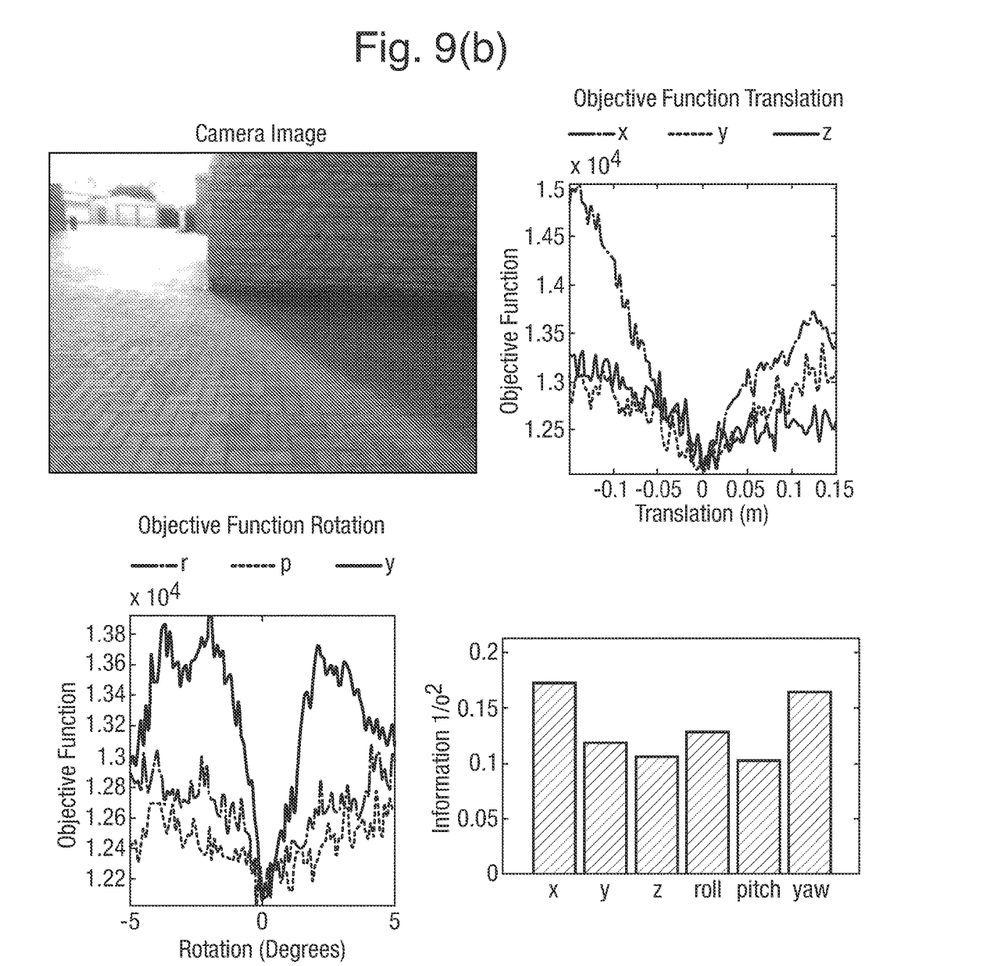

FIG. 9 shows how frames with ill conditioned and noisy calibration estimates, see FIG. 9(*b*), are automatically assigned a higher $\sigma^2$, as per the process described above. Estimates with more distinct troughs around the minima, FIG. 9(*a*), conversely are assigned a lower $\sigma^2$ and contribute more information to the final calibration estimate after fusion. This is illustrated by the bar charts in FIG. 9, which plot the inverse variances, $1/\sigma^2$, which effectively weight the individual estimates in the Bayes filter. Here, the frame in FIG. 9(*a*) is given over 50% more weight that the frame in FIG. 9(*b*). Given that the stereo camera and 2D LIDAR do not have instantaneously overlapping fields of view this calibration would not be possible with any of the other known techniques.

FIG. 9 shows the objective function plotted about the estimated extrinsic calibration for two frames. It can be seen that there is a distinct convex peak in a) but less so in b). However, away from the true solution the objective function is non-convex, which justifies the choice of the simple search based optimisation over a traditional gradient-based method. It is possible that the final calibration could be improved by a final gradient decent type optimisation once the search has found a coarse solution. It can also be seen that some degrees of freedom are more sensitive than others, this is thought to be due to the geometry of the typical scene and sensor placement. Note this is handled naturally by the filtering performed by the application.

Embodiments of the method/system described herein can provide an automatic calibration procedure for a monocular camera and a 2D LIDAR under general motion. Embodiments can be used without the need for targets, enabling on-the-fly calibration. Embodiments also do not require sensors to be mounted such that they have overlapping views. Unlike other known approaches, embodiments exploit the motion of the vehicle using a trajectory estimate to build a swathe of LIDAR data to generate laser reflectance imagery for comparison to images captured by the camera. Therefore, embodiments of the method can be used as long as the motion of the vehicle causes eventual overlap of the observed workspaces. This can not only provide independence from sensor placement, but can also provide a convenient and robust approach to calibrating a camera against a 2D LIDAR. This feature of the calibration is particularly useful in transport as often sensors can be mounted all over the vehicle with non-overlapping fields of view. Embodiments can compute a robust correlation measure that is invariant to non-linearities in the reflectance returns and camera images. Experiments indicate that the system produces consistent results. Field trials suggest that the approach achieves an extrinsic calibration accuracy less than 1 cm in translation and 0.01 radians in rotation.

The invention claimed is:

1. A method of determining extrinsic calibration parameters for at least one pair of sensing devices mounted on transportable apparatus, the method including:
obtaining image data representing a plurality of images captured by an image generating sensing device of the pair at a series of poses during motion through an environment of transportable apparatus;
obtaining data representing a 3D point cloud based on data produced by a 2D LIDAR sensing device of the pair during the motion through the environment of the transportable apparatus;
selecting an image from the image data, the image being captured by the image generating sensing device at a particular said pose;
generating a laser reflectance image based on a portion of the 3D point cloud data corresponding to the particular pose of the image generating sensing device;
computing a metric indicating a measure of alignment between the selected image and the corresponding laser reflectance image; and
using the metric to determine extrinsic calibration parameters for at least one of the sensing devices.

2. The method according to claim 1, including using cubic interpolation to sample intensity values of pixels of the laser reflectance image and pixels of the selected image to generate the laser reflectance image as a function of the extrinsic calibration parameters of the laser 2D LIDAR sensing device.

3. The method according to claim 1, wherein the computing of the metric uses an edge-based, weighted Sum of Squared Difference (SSD) objective function to measure the alignment of the selected image and the laser reflectance image.

4. The method according to claim 3, including performing a Gaussian smoothing operation on the selected image and the laser reflectance image.

5. The method according to claim 4, including performing patch-based normalisation of the selected image and the laser reflectance image.

6. The method according to claim 5, including using an iterative grid-based optimisation technique to search over the poses that maximise the alignment of the selected image and the laser reflectance image.

7. The method according to claim 1, wherein the 3D point cloud is created using a trajectory estimate obtained using an Inertial Navigation System of the transportable apparatus.

8. The method according to claim 1, wherein the 3D point cloud is created using a trajectory estimate obtained using visual odometry.

9. Apparatus including a processor configured to execute a method according to claim 1.

10. Apparatus adapted to determine extrinsic calibration parameters for at least one pair of sensing devices mounted on transportable apparatus, the apparatus including:
an image generating sensing device of the pair for, in use, producing image data representing a plurality of images captured at a series of poses during motion through an environment by transportable apparatus;
a 2D LIDAR sensing device of the pair for, in use, producing laser data during the motion through the environment by the transportable apparatus;
a device configured to generate 3D point cloud data based on the laser data;
a device configured to select an image from the image data, the image being captured by the image generating sensing device at a particular said pose;
a device configured to generate a laser reflectance image based on a portion of the 3D point cloud data corresponding to the particular pose of the image generating sensing device;
a device configured to compute a metric indicating a measure of alignment between the selected image and the corresponding laser reflectance image; and
a device configured to use the metric to determine extrinsic calibration parameters for at least one of the sensing devices.

11. Apparatus according to claim 10, wherein the image generating sensing device comprises a stereo or monocular camera.

12. A vehicle including apparatus according to claim 10.

13. A computer program product stored on a non-transitory computer-readable medium and encoding instructions that when executed by one or more processors cause a process to be carried out for determining extrinsic calibration parameters for at least one pair of sensing devices mounted on transportable apparatus, the process including:
obtaining image data representing a plurality of images captured by an image generating sensing device of the pair at a series of poses during motion through an environment of transportable apparatus;

obtaining data representing a 3D point cloud based on data produced by a 2D LIDAR sensing device of the pair during the motion through the environment of the transportable apparatus;

selecting an image from the image data, the image being captured by the image generating sensing device at a particular said pose;

generating a laser reflectance image based on a portion of the 3D point cloud data corresponding to the particular pose of the image generating sensing device;

computing a metric indicating a measure of alignment between the selected image and the corresponding laser reflectance image; and using the metric to determine extrinsic calibration parameters for at least one of the sensing devices.

14. The computer program product stored on a non-transitory computer-readable medium according to claim 13, the process further including using cubic interpolation to sample intensity values of pixels of the laser reflectance image and pixels of the selected image to generate the laser reflectance image as a function of the extrinsic calibration parameters of the laser 2D LIDAR sensing device.

15. The computer program product stored on a non-transitory computer-readable medium according to claim 13, wherein the computing of the metric uses an edge-based, weighted Sum of Squared Difference (SSD) objective function to measure the alignment of the selected image and the laser reflectance image.

16. The computer program product stored on a non-transitory computer-readable medium according to claim 15, including performing a Gaussian smoothing operation on the selected image and the laser reflectance image.

17. The computer program product stored on a non-transitory computer-readable medium according to claim 16, including performing patch-based normalisation of the selected image and the laser reflectance image.

18. The computer program product stored on a non-transitory computer-readable medium according to claim 17, including using an iterative grid-based optimisation technique to search over the poses that maximise the alignment of the selected image and the laser reflectance image.

19. The computer program product stored on a non-transitory computer-readable medium according to claim 13, wherein the 3D point cloud is created using a trajectory estimate obtained using an Inertial Navigation System of the transportable apparatus.

20. The computer program product stored on a non-transitory computer-readable medium according to claim 13, wherein the 3D point cloud is created using a trajectory estimate obtained using visual odometry.

* * * * *